United States Patent
Wen et al.

(10) Patent No.: US 9,454,247 B2
(45) Date of Patent: Sep. 27, 2016

(54) INTERACTIVE WRITING DEVICE AND OPERATING METHOD THEREOF USING ADAPTIVE COLOR IDENTIFICATION MECHANISM

(71) Applicant: INDUSTRIAL TECHNOLOGY RESEARCH INSTITUTE, Hsinchu (TW)

(72) Inventors: Yi-Lun Wen, Xinwu Township (TW); Chung-Hsien Wu, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/534,802

(22) Filed: Nov. 6, 2014

(65) Prior Publication Data

US 2015/0169088 A1    Jun. 18, 2015

(30) Foreign Application Priority Data

Dec. 13, 2013    (TW) .............................. 102146248 A

(51) Int. Cl.
  *G06F 3/0354*    (2013.01)
  *G09G 5/02*    (2006.01)
  *G06F 3/042*    (2006.01)

(52) U.S. Cl.
  CPC ......... *G06F 3/03545* (2013.01); *G06F 3/0425* (2013.01); *G09G 5/02* (2013.01); *G06F 2203/04104* (2013.01)

(58) Field of Classification Search
  CPC ............... G06F 3/011; G06F 345/156; G06F 345/179; G06F 3/033; G06F 3/0354; G06F 3/03545; G06F 2203/04101; G06F 3/03542
  See application file for complete search history.

(56) References Cited

U.S. PATENT DOCUMENTS 6,346,933 B1    2/2002  Lin
7,703,926 B2    4/2010  Hong et al.
(Continued)

FOREIGN PATENT DOCUMENTS

EP    0 202 867 A2    11/1986
TW    526977    4/2003
(Continued)

OTHER PUBLICATIONS

Bosetti et al., "Interactive whiteboards based on the WiiMote: validation on the field.", 14th International Conference on Interactive Collaborative Learning, Sep. 21-23, 2011, pp. 269-273.
(Continued)

*Primary Examiner* — Premal Patel
(74) *Attorney, Agent, or Firm* — Birch, Stewart, Kolasch & Birch, LLP

(57) ABSTRACT

An operating method for an interactive writing device is provided. The operating method includes following steps. A visible light image is captured in response to an original outputted image. A tag searching region is established in the visible light image in response to a writing operation performed by a writing object having a color tag pattern. The original outputted image corresponding to the tag searching region is filtered from the visible light image in the tag searching region to generate a local processed image. A color tag corresponding to the color tag pattern of the writing object is searched from the local processed image. A color value corresponding to the color tag is generated.

12 Claims, 11 Drawing Sheets

(56) References Cited

U.S. PATENT DOCUMENTS

| | | | |
|---|---|---|---|
| 8,275,197 | B2 | 9/2012 | Hawkins et al. |
| 8,411,053 | B2 | 4/2013 | Doubrava et al. |
| 2012/0207345 | A1* | 8/2012 | Tang .............. G06F 3/017 |
| | | | 382/103 |
| 2013/0135206 | A1 | 5/2013 | Bolt et al. |
| 2013/0191768 | A1 | 7/2013 | Thompson et al. |
| 2013/0257825 | A1* | 10/2013 | Thompson .......... G06F 3/03542 |
| | | | 345/179 |
| 2013/0283213 | A1* | 10/2013 | Guendelman ........ G06F 3/017 |
| | | | 715/848 |

FOREIGN PATENT DOCUMENTS

| | | |
|---|---|---|
| TW | I258705 B | 7/2006 |
| TW | M424535 U | 3/2012 |
| TW | 201216136 A | 4/2012 |
| TW | 201234098 A | 8/2012 |
| TW | I408488 B | 9/2013 |
| TW | I408570 B | 9/2013 |
| TW | 201349029 A | 12/2013 |

OTHER PUBLICATIONS

Camplani et al., "Low-Cost Efficient Interactive Whiteboard", IEEE International Conference on Consumer Electronics (ICCE), 2012, pp. 686-687.

Ebrahimpour-Komleh et al., "Design of an Interactive Whiteboard System Using Computer Vision Techniques", Proceeding of the 6th International Symposium on Mechatronics and its Applications (ISMA09), Mar. 24-26, 2009, pp. ISMA09-1-ISMA09-4.

Lech et al., "Gesture-based Computer Control System applied to the Interactive Whiteboard", Proceedings of the 2nd International Conference on Information Technology, ICIT, Jun. 28-30, 2010, pp. 75-78.

Puckdeepun et al., "Investigating Collaborative Interaction using Interactive Table and IR devices", International Conference on User Science Engineering (i-USEr), 2010, pp. 83-88.

Qian et al., "A Location Tracking Method Based on Reflection Image Detection Used in Interactive Projector-camera System", International Workshop on Imaging Systems and Techniques, May 11-12, 2009.

* cited by examiner

INTERACTIVE WRITING DEVICE AND OPERATING METHOD THEREOF USING ADAPTIVE COLOR IDENTIFICATION MECHANISM

This application claims the benefit of Taiwan application Serial No. 102146248, filed Dec. 13, 2013, the disclosure of which is incorporated by reference herein in its entirety.

TECHNICAL FIELD

The disclosure relates in general to an interactive writing device and an operating method thereof, and more particularly to an interactive writing device and an operating method thereof using adaptive color identification mechanism.

BACKGROUND

In recent years, technology of interactive projection or interactive whiteboard has become more and more popular. Conventionally, the interactive pen and display device of the interactive projector utilize radio waves to transmit data. This kind of interactive pen usually has the function of wireless mouse. The user can select writing color by pressing the button of the interactive pen or using the interactive pen to click on the function menu shown on a frame.

However, conventionally, when the user wants to change the writing color, the user has to enter a function menu with several times of clicking. Besides, conventional interactive projection system normally only supports one writing color in the same writing region.

SUMMARY

The disclosure is directed to an interactive writing device and an operating method thereof using adaptive color identification mechanism.

According to one embodiment, an operating method for an interactive writing device is provided. The operating method includes following steps. A visible light image is captured in response to an original outputted image. A tag searching region is established in the visible light image in response to a writing operation performed by a writing object having a color tag pattern. The original outputted image corresponding to the tag searching region is filtered from the visible light image in the tag searching region to generate a local processed image. A color tag corresponding to the color tag pattern of the writing object is searched from the local processed image. A color value corresponding to the color tag is generated.

According to another embodiment, an interactive writing device is provided. The interactive writing device includes a capturing unit and a processing unit. The capturing unit fetches a visible light image in response to an original outputted image. The processing unit is coupled to the capturing unit, and includes a search region establishing unit, a color recovery unit, a tag searching unit and a display control unit. The search region establishing unit establishes the tag searching region in the visible light image in response to a writing operation performed by a writing object having a color tag pattern. The color recovery unit filters the original outputted image corresponding to the tag searching region from the visible light image in the tag searching region to generate a local processed image. The tag searching unit searches a color tag corresponding to the color tag pattern of the writing object from the local processed image. The display control unit generates a color value corresponding to the color tag.

According to an alternative embodiment, an interactive writing device used in an interactive whiteboard or an interactive projection device is provided. The interactive writing device includes a capturing unit and a processing unit. The capturing unit fetches a visible light image in response to an original outputted image. The processing unit is coupled to the capturing unit, and includes a search region establishing unit, a color recovery unit, a tag searching unit and a display control unit. The search region establishing unit establishes the tag searching region in the visible light image in response to a writing operation performed by a writing object having a color tag pattern. The color recovery unit filters the original outputted image corresponding to the tag searching region from the visible light image in the tag searching region to generate a local processed image. The tag searching unit searches a color tag corresponding to the color tag pattern of the writing object from the local processed image. The display control unit generates a color value corresponding to the color tag.

The above and other aspects of the invention will become better understood with regard to the following detailed description of the preferred but non-limiting embodiment (s). The following description is made with reference to the accompanying drawings.

Figure 1:
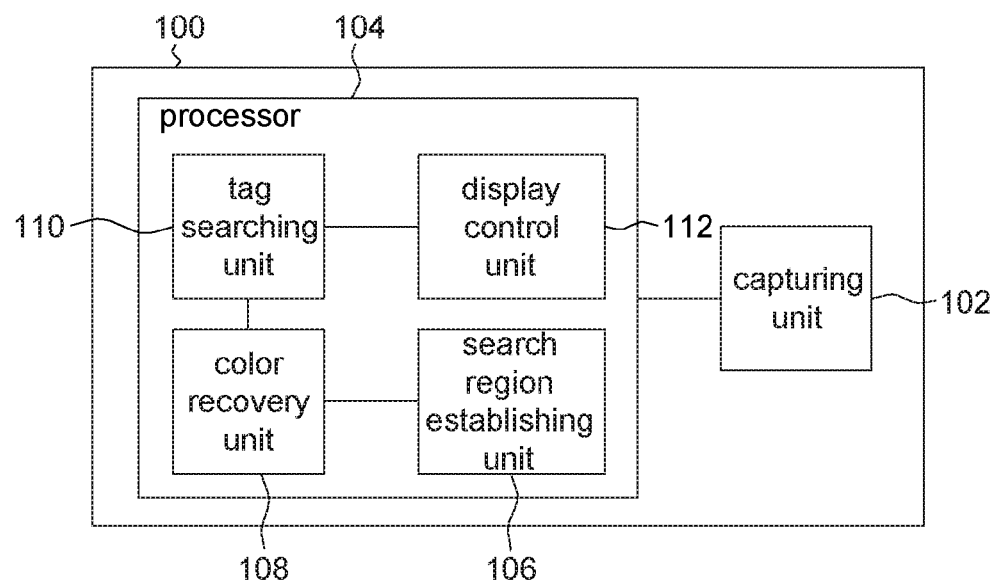
FIG. 1 is a block diagram of an interactive writing device according to an embodiment of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

A number of embodiments are disclosed below for elaborating the disclosure. However, the embodiments of the disclosure are for detailed descriptions only, not for limiting the scope of protection of the disclosure. Furthermore, secondary or unimportant elements are omitted in the accompanying diagrams of the embodiments for highlighting the technical features of the disclosure.

Figure 2:
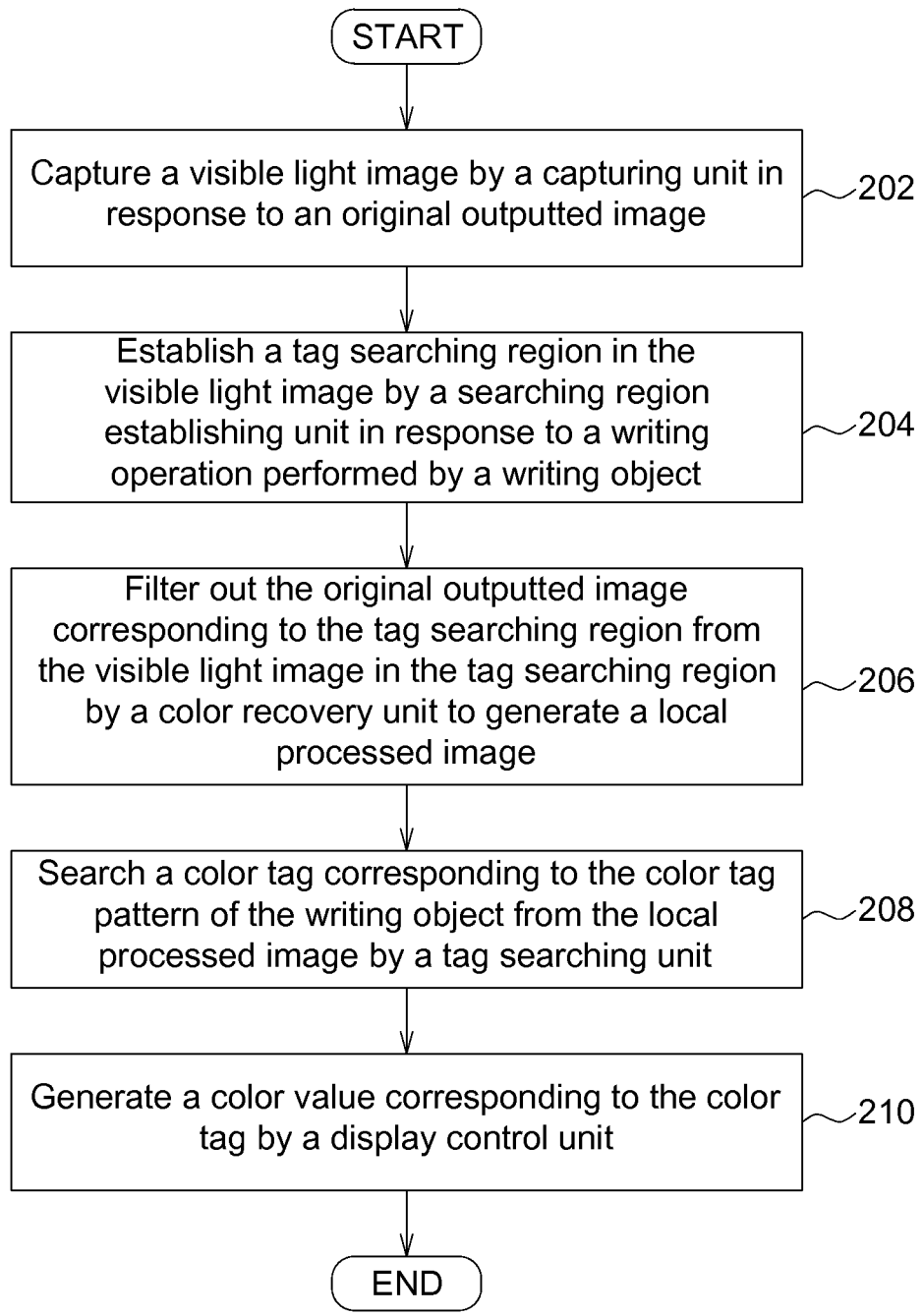
FIG. 2 is a flowchart of an operating method for an interactive writing device.

Referring to FIG. 1 and FIG. 2, FIG. 1 is a block diagram of an interactive writing device 100 according to an embodiment of the present disclosure and FIG. 2 is a flowchart of an operating method for the interactive writing device 100. The interactive writing device 100 includes a capturing unit 102 and a processing unit 104. The processing unit 104 includes a search region establishing unit 106, a color recovery unit 108, a tag searching unit 110 and a display control unit 112. The capturing unit 102 is, for example, a light capturing device, such as a camera. The processing unit 104 is, for example, an integrated circuit or other processor with computational capability. The search region establishing unit 106, the color recovery unit 108, the tag searching unit 110 and the display control unit 112 respectively can be realized by an operation processing circuit having corresponding function or a software program enabling the processing unit 104 to execute corresponding function.

In step 202, the capturing unit 102 captures a visible light image in response to an original outputted image. The original outputted image is, for example, an image projected by a projector or an interactive projection device, or an image displayed on a monitor (such as an interactive whiteboard). After the original outputted image was outputted (for example, after the image is projected or displayed on a whiteboard or an electronic whiteboard), the capturing unit 102 shoots the original outputted image projected on the whiteboard to generate a corresponding visible light image. The visible light image is, for example, a digital image shot by a visible light camera, wherein the color of the image content falls in a visible light range.

In step 204, the search region establishing unit 106 establishes a tag searching region in the visible light image in response to a writing operation performed by a writing object. The writing object is, for example, an electronic whiteboard pen or other object that can be used for writing purposes, such as a pen-like object or a finger. The writing object can be used for writing on an ordinary whiteboard or an electronic whiteboard. The writing object includes a color tag pattern. The color tag pattern can be used for indicating the writing color of the writing object. For example, if the writing object includes a red color tag pattern, the writing color of the writing object is red. The color tag pattern shot by the capturing unit 102 can be regarded as a color tag in the visible light image. The tag searching region defines the region in which the color tag may appear in the visible light image. The size of the region is, for example, smaller than the size of the entire visible light image.

In step 206, the color recovery unit 108 filters out the original outputted image corresponding to the tag searching region from the visible light image in the tag searching region to generate a local processed image. Specifically, since the content of the original outputted image is known, the original outputted image can be filtered out from the visible light image or the composition of the original outputted image in the visible light image can be reduced by using image processing technologies, so that the color of the visible light image in the tag searching region will be less affected by the original outputted image.

In step 208, the tag searching unit 110 searches a color tag corresponding to the color tag pattern of the writing object from the local processed image. Since the color of the content in the local processed image is highlighted (or recovered), the tag searching unit 110 can identify the position of the color tag according to the color value corresponding to each image point of the local processed image.

In step 210, the display control unit 112 generates a color value corresponding to the color tag. For example, the display control unit 112 may analyze the color composition of the color tag and perform color classification according to the color components to obtain a color value corresponding to the color tag. The color value is, for example, an RGB image value or an image value corresponding to other color space, such as a YCbCr image value.

According to the above, the interactive writing device 100 of the present embodiment of the disclosure can effectively remove color interference, caused by the original outputted image, from the color tag pattern of the writing object. In addition, by means of establishing the tag searching region, the interactive writing device 100 not only effectively reduces the computational cost required for searching the color tag but also reduces the chance of misjudging the color tag.

In another example, after the interactive writing device 100 identifies the color value corresponding to the color tag, the display control unit 112 may activate a specific or a predetermined function (such as opening the whiteboard, activating a writing function, activating a specific color, activating a specific font, and so on) for the user to perform different operations. Alternatively, the display control unit 112 may activate a predetermined function according to the color value corresponding to the color tag in response to the writing operation of the writing object. For example, after the interactive writing device 100 of the present embodiment of the disclosure identified the color value, the interactive writing device 100 not only shows the writing trace of the writing object but also executes other function. For example, the white color can be used as a rubber, a left key or right key of a mouse, or a writing pad.

Figure 3A:
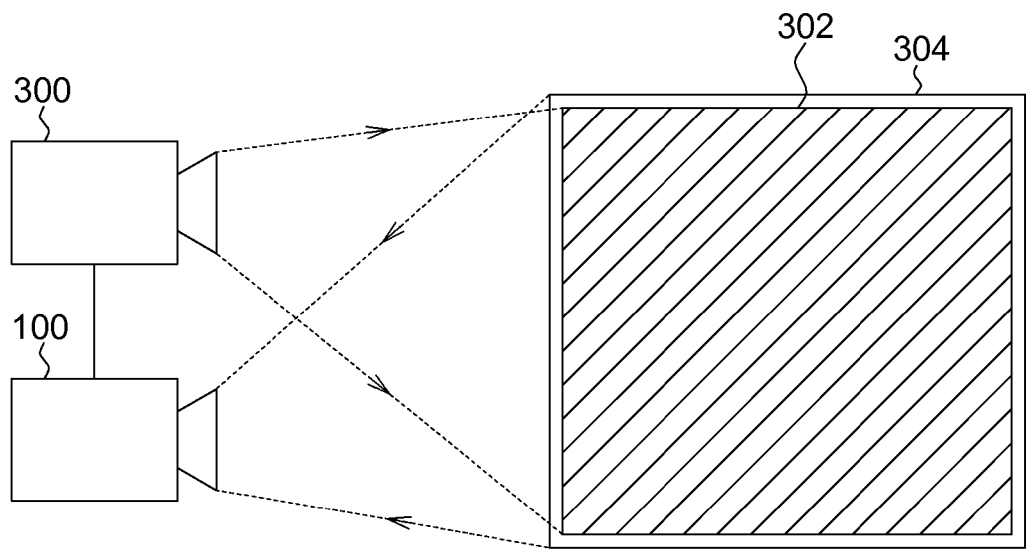
FIG. 3A is a schematic diagram of a projector projecting an original outputted image to a projection region.
Figure 3B:
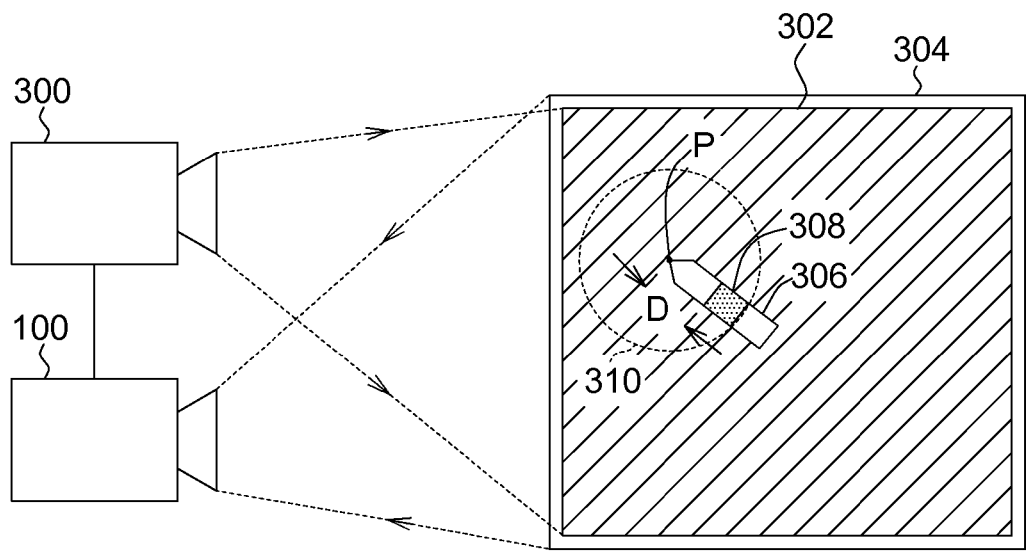
FIG. 3B is a schematic diagram of a writing object performing writing operation in projection region.
Figure 3C:
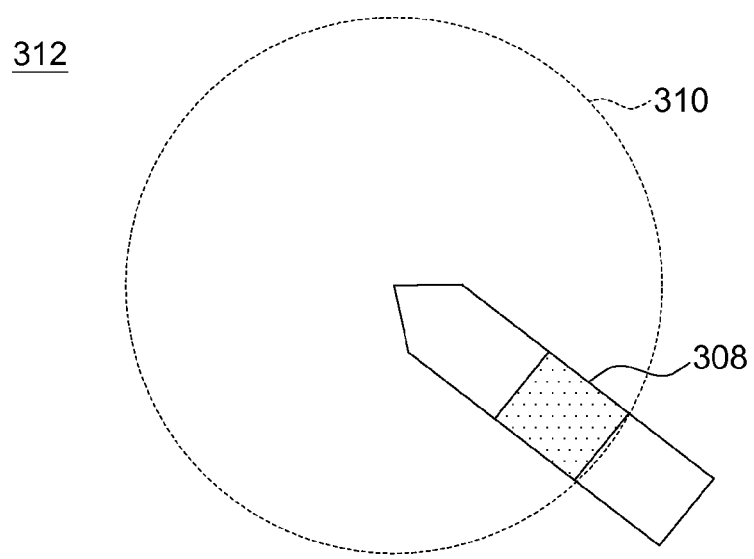
FIG. 3C is a schematic diagram of a local processed image.

For illustration, the operations of the interactive writing device 100 are described below with the reference to FIGS. 3A-3C. The scenarios shown in FIGS. 3A-3C are exemplified by using an interactive projection device. The user uses a writing object (such as an electronic whiteboard pen) including a color tag pattern to perform a writing operation in a projection region. By means of the interactive writing device 100, the writing trace formed by the writing object shows a color corresponding to the color tag pattern. It is understood that the present disclosure is not limited to above examples.

Referring to FIG. 3A, a schematic diagram of a projector 300 projecting an original outputted image 302 onto a projection region 304 is shown. In the present example, the interactive writing device 100 is coupled to the projector 300 and obtains the information of the original outputted image through data transmission. The interactive writing device 100 further uses the capturing unit 102 to shoot the projection region 304 to generate a corresponding visible light image. In the scenario of FIG. 3A, the projector 300 projects a pure green original outputted image 302 to the projection region 304.

Referring to FIG. 3B, a schematic diagram of a writing object 306 (such as an electronic whiteboard pen) performing a writing operation in the projection region 304 is shown. In the present example, the writing object 306 includes a color tag pattern 308 which is pure red under the irradiation of a white light source. Since the color tag pattern 308 is affected by the original outputted image 302 (pure green) projected on the projection region 304, for the capturing unit 102 of the interactive writing device 100, the image of the color tag obtained from the color tag pattern 308 will not correspond to the pure red color value but will correspond to a near black color value instead.

On the other hand, when writing operation is performed by the writing object 306 in the projection region 304, the interactive writing device 100 can generate a position information (for example, the coordinates in the image) of a writing point P by the search region establishing unit 106, and the tag searching region 310 is further established according to the position information of the writing point P. As can be seen from FIG. 3B, the position of the writing point P falls within the tag searching region 310, and the range of the tag searching region 310 appropriately covers the color tag corresponding to the color tag pattern 308. In other words, the interactive writing device 100 only needs to search the color tag from the vicinity of the writing point P (equivalent to the tip of the writing object 306). Thus, the computational cost required for searching the color tag can be significantly reduced. It is understood that the tag searching region 310 of the present embodiment of the disclosure is not limited to the circular shape illustrated in FIG. 3B. Suppose the actual distance D between the writing end of the writing object 306 (such as the tip of the writing object 306) and the color tag pattern 308 corresponds to a predetermined length (e.g., N-pixel length, and N is a positive integer larger than 1) in the visible light image, the maximum distance between the position of the writing point P and a boundary of the tag searching region 310 can be set to be at least larger than the predetermined length.

In the present example, when the writing operation is performed by the writing object 306 in the projection region 304, an infra-red light spot will be generated at the starting point of writing. After detecting the infra-red light spot by the capturing unit 102, the capturing unit 102 transmits position information of the infra-red light spot to the search region establishing unit 106, and a position information corresponding to the writing point P is generated accordingly by the search region establishing unit 106.

Referring to FIG. 3C, a schematic diagram of a local processed image 312 is shown. In the present example, the color recovery unit 108 filters the original outputted image corresponding to the tag searching region 310 from the visible light image in the tag searching region 310 to generate a local processed image 312. Then, the display control unit 112 analyses the color composition on the color tag in the local processed image 312 and performs color classification according to the color components to obtain a color value corresponding to the color tag. Taking the scenario of the present embodiment as an example. Suppose that the RGB color values of the color tag region respectively are 120(R)/180(G)/80(B) before the original outputted image 302 is filtered from the visible light image in the tag searching, through the image processing performed by the color recovery unit 108, the RGB color values of the color tag become 200(R)/80(G)/50(B) or 50(R)/30(G)/20(B) respectively. Meanwhile, since the RGB color values of the color tag are obviously inclined to the red color classification, the display control unit 112 classifies the color value corresponding to the color tag as red (suppose the display control unit 112 already knows that the color tag of the writing object could be red, blue or green). Moreover, suppose that the RGB color values of a color block respectively are 80(R)/200(G)/80(B) before the original outputted image 302 is filtered, through the image processing performed by the color recovery unit 108, the RGB color values of the color block become 100(R)/100(G)/100(B) respectively. Meanwhile, since the RGB color values of the color tag are not inclined to any particular color classification, the color block is regarded as a "unmarked color block". The unmarked color blocks can be removed from the tag searching region 310.

It is understood that the color tag pattern of the present embodiment of the disclosure is not limited to the patterns illustrated in FIGS. 3A-3C. For example, the color tag pattern may include two parts: color region and color code. Alternatively, the shape of the color tag pattern can be other than a rectangle. For example, the shape of the color tag pattern can further extend from the tip of the writing object. Or, the color tag pattern can be any shape on a writing object including color region and color code.

In the scenarios of FIGS. 3A-3C, the search region establishing unit 106 establishes the tag searching region 310 according to the position of the writing point P. However, the disclosure is not limited thereto. The search region establishing unit 106 can also establish the tag searching region by other means exemplified in FIG. 4 and FIG. 5 below.

Figure 4:
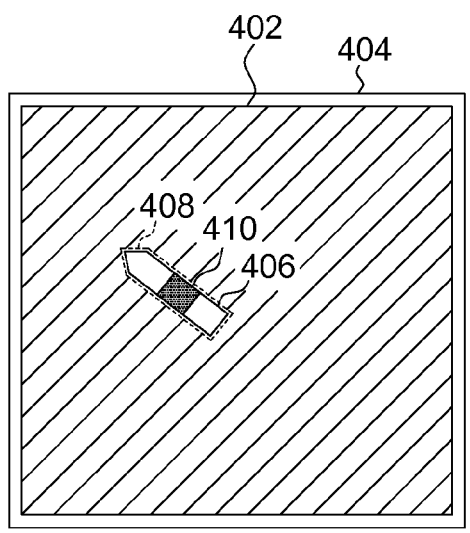
FIG. 4 is another example of a search region establishing unit establishing a tag searching region.

Referring to FIG. 4, another example of a search region establishing unit 106 establishing a tag searching region is shown. As shown in FIG. 4, the original outputted image 402 is projected onto the projection region 404. When the writing object 406 is used for writing, the interactive writing device 100 uses the capturing unit 102 to obtain a corresponding visible light image. Then, the search region establishing unit 106 identifies the shape of the writing object 406 (for example, the outer contour of the writing object 406) in the visible light image to establish a corresponding tag searching region 408 according to the shape of the writing object 406.

In an example, the search region establishing unit 106 identifies the shape of the writing object 406 according to the features of the shape of the writing object 406 (such as the tip of the writing object 406) to establish a tag searching region 408 corresponding to the shape of the writing object 406. As indicated in FIG. 4, the search region establishing unit 106 can search the color tag corresponding to the color tag pattern 410 from the morphological region of the writing object 406, so that the chance of misjudging the color tag can be effectively reduced.

Figure 5:
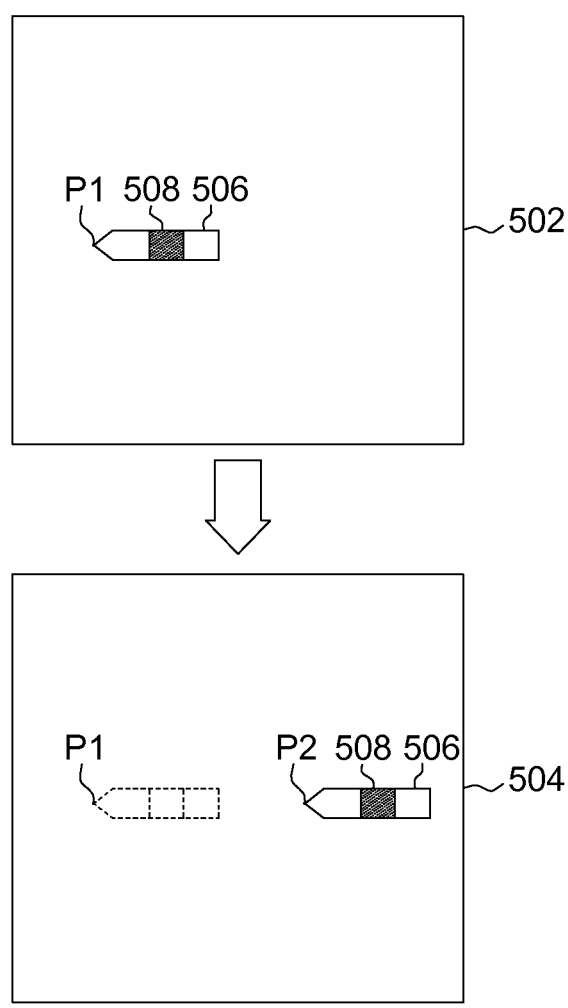
FIG. 5 is another example of a search region establishing unit establishing a tag searching region.

Referring to FIG. 5, another example of a search region establishing unit 106 establishing a tag searching region is shown. As shown in FIG. 5, images 502 and 504 are visible light images shot by the capturing unit 102 at time points t1 and t2 respectively. The writing operation of the writing object 506 is performed by moving the writing object 506 from left side to right side. Thus, in FIG. 5, the writing object 506 generates a writing point P1 at the left hand side of the image at the time point t1, and generates a writing point P2 at the right hand side of the image at the time point t2. Therefore, through dynamic movement tracking (e.g, obtaining the information of moving portion and moving vector in an image by detecting how the image value of each image point varies with the time), the search region establishing unit 106 can identifies the shape or position of the writing object 506, and correspondingly adjusts the range of the tag searching region in which the color tag pattern 508 can be easily searched. For example, the range of the tag searching region is restricted to be within the morphological range of the writing object 506 as possible. In other words, during the period in which the writing object 506 performs a writing operation, the capturing unit 102 sequentially captures a plurality of visible light images corresponding to different time points. The search region establishing unit 106 compares the visible light images corresponding to different time points to generate an image movement information corresponding to the writing object 506 and further establishes a tag searching region according to the image movement information. Thus, even though the writing object 506 performs a writing operation in a region having complicated background, the search region establishing unit 106 still can establish an effective tag searching region in which the color tag pattern 508 can be easily searched.

Figure 6:
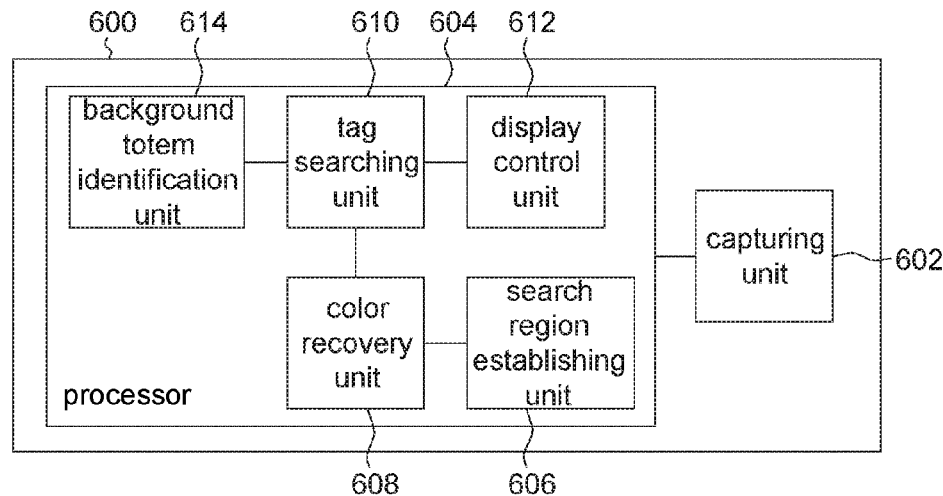
FIG. 6 is an interactive writing device according to another embodiment of the disclosure.

FIG. 6 is an interactive writing device 600 according to another embodiment of the disclosure. The interactive writing device 600 includes a capturing unit 602 and a processing unit 604. The processing unit 604 includes a search region establishing unit 606, a color recovery unit 608, a tag searching unit 610, a display control unit 612 and a background totem identification unit 614. The interactive writing device 600 of the present embodiment is different from the interactive writing device of above embodiments in that the interactive writing device 600 further includes a background totem identification unit 614. The background totem identification unit 614 generates a background totem according to the difference between the original outputted image and the visible light image, and further marks the background totem in the visible light image. When the tag searching unit 610 searches for the color tag, the part of the visible light image marked as the background totem is ignored. Therefore, the interactive writing device 600 of the present embodiment can effectively avoid background object interfering with the identification of the color tag.

Figure 7:
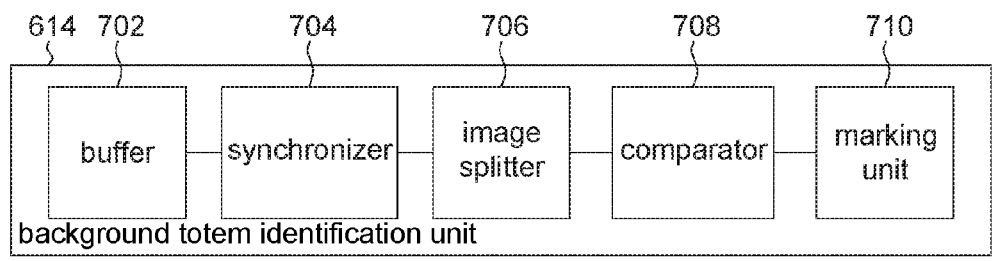
FIG. 7 is a block diagram of a background totem identification unit.
Figure 8:
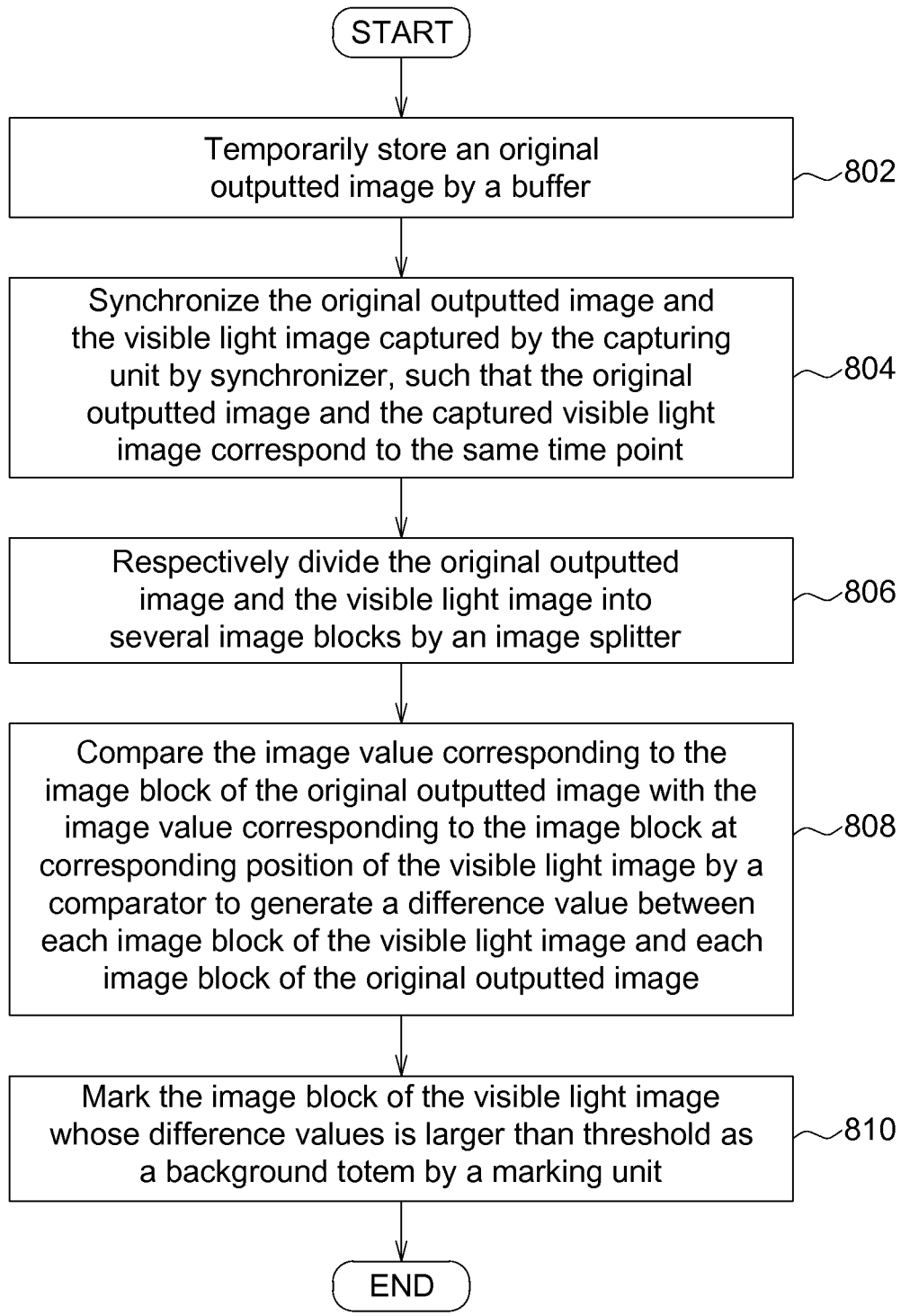
FIG. 8 is a flowchart of an operating method of a background totem identification unit.

Referring to FIG. 7 and FIG. 8. FIG. 7 is a block diagram of a background totem identification unit 614. FIG. 8 is a flowchart of an operating method 800 of a background totem identification unit 614. The background totem identification unit 614 includes a buffer 702, a synchronizer 704, an image splitter 706, a comparator 708 and a marking unit 710.

In step 802, the buffer 702 temporarily stores an original outputted image. The original outputted image is outputted through an external device such as a projector or a monitor.

In step 804, the synchronizer 704 synchronizes the original outputted image and the visible light image captured by the capturing unit 602, such that the original outputted image and the captured visible light image correspond to the same time point. Take the the original outputted image outputted by a projector for example. The time point at which the projector outputs the original outputted image is slightly different from the time point at which the capturing unit 602 captures the corresponding visible light image. Therefore, the original outputted image and the visible light image can be synchronized by the synchronizer 704 so that the original outputted image and the visible light image have the same time mark M.

In step 806, the image splitter 706 respectively divides the original outputted image and the visible light image into several image blocks. The image blocks include different image values (such as RGB pixel values) corresponding to the content of the image. In an example, a space mark F is further assigned to each image block. For example, space mark F=30 indicates an image block 30 of the image.

In step 808, the comparator 708 compares the image values corresponding to the image block of the original outputted image with the image values corresponding to the image block at corresponding positions of the visible light image to generate a difference value between each image block of the visible light image and each image block of the original outputted image. For example, with regard to the original outputted image and the visible light image that have the same time mark M, the comparator 708 compares the image values of the image blocks of the two images that have the same space mark F to obtain a difference value corresponding to each image block.

In step 810, the marking unit 710 marks the image block of the visible light image whose difference values is larger than threshold T as a background totem. If the image value difference between the image value corresponding to a particular image block of the visible light image (such as the image block with time mark M=10 and space mark=50) and the image value corresponding to an image block of the original outputted image (such as the image block with time mark M=10 and space mark=50) is larger than a predetermined measure (that is, threshold T), it can be determined that the image block may be a background totem, and does not belong to the image content of the original outputted image.

Figure 9:
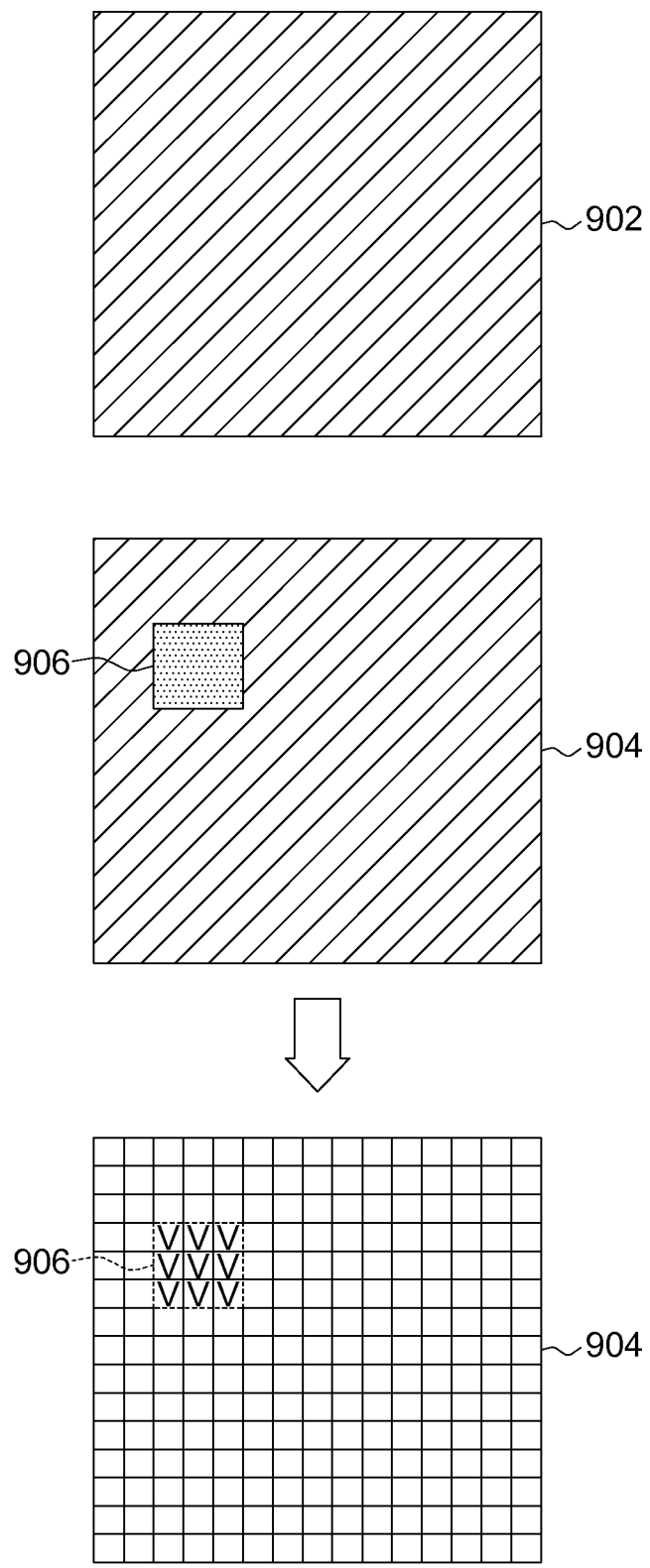
FIG. 9 is a schematic diagram of background totem marked in a visible light image.

Referring to FIG. 9, a schematic diagram of background totem marked in a visible light image is shown. As shown in FIG. 9, taking the interactive projection device as an example, the image 902 is an original outputted image outputted by way of projection, the image 904 is a visible light image shot by the capturing unit 602. In the present example, the projection region of the original outputted image 902 includes a background object (such as a sticker on the wall), and thus the visible light image 904 has a pattern 906 of the background object. After sequentially comparing the image blocks of the original outputted image 902 with the image blocks of the visible light image 904, it can be decided that the image blocks corresponding to the pattern 906 are significantly different from the image blocks corresponding to the original outputted image 902. After the image blocks with significant differences are marked in the visible light image 904 (denoted by ticked lattice in FIG. 9), the marking of the background totem is completed.

Figure 10:
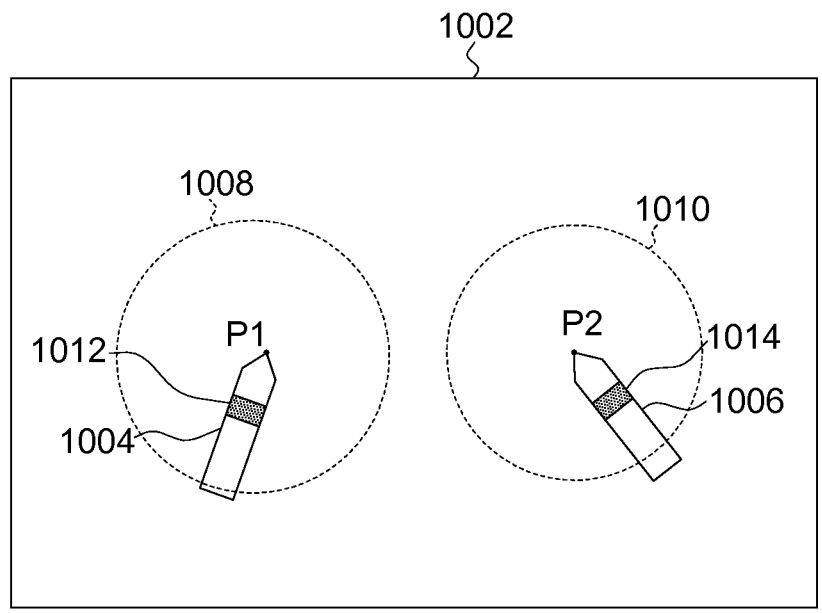
FIG. 10 is a schematic diagram of an example of writing operation performed by several writing objects having color tag pattern.

Referring to FIG. 10, a schematic diagram of an example of writing operation performed by several writing objects having color tag patterns. As shown in FIG. 10, within the writing region 1002, two writing objects 1004 and 1006 respectively perform a writing operation and generate writing points P1 and P2 respectively corresponding to tag searching regions 1008 and 1010. The writing objects 1004 and 1006 respectively include color tag patterns 1012 and 1014. Since the writing objects 1004 and 1006 are separated by a larger distance (the tag searching regions 1008 and 1010 are not overlapping), the interactive writing device of the present embodiment can decide the color values of the color tags corresponding to the color tag patterns 1012 and 1014 on the writing objects 1004 and 1006 by means of color tag searching and color recovery mechanism disclosed above and further generate writing traces having corresponding colors. Suppose the color of the color tag pattern 1012 on the writing object 1004 is recovered by the interactive writing device of the present embodiment, the value of the recovered color is corresponding to blue color value. Meanwhile, the writing trace generated in the writing operation performed by the writing object 1004 shows blue.

Similarly, the color of the color tag pattern 1014 of the writing object 1006 is recovered by the interactive writing device of the present embodiment of the disclosure, and the value of the recovered color is corresponding to red color value. Meanwhile, the writing trace generated in the writing operation performed by the writing object 1004 shows red.

Figure 11:
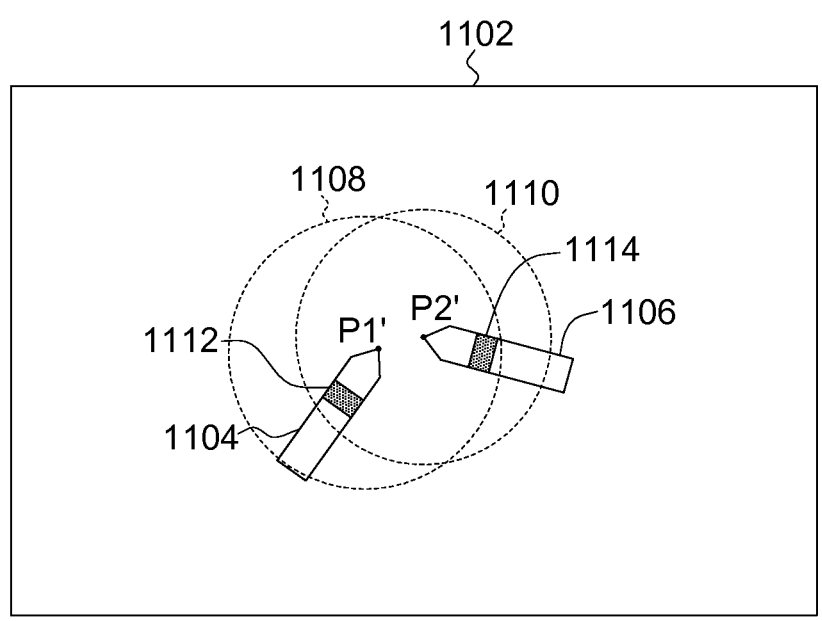
FIG. 11 is a schematic diagram of another example of writing operation performed by several writing objects having color tag pattern.

Referring to FIG. 11, a schematic diagram of another example of writing operation performed by several writing objects having color tag pattern is shown. As indicated in FIG. 11, within the writing region 1102, two writing objects 1104 and 1106 respectively perform writing operation and generate writing points P1' and P2' respectively corresponding to tag searching regions 1108 and 1110. The writing object 1104 and 1106 respectively have color tag patterns 1112 and 1114. In the present example, the writing objects 1104 and 1106 are separated be a shorter distance (the tag searching regions 1108 and 1110 are overlapping). Suppose the writing objects 1104 and 1106 start writing at different time points (for example, the generation time of the writing point P1' is earlier than that of the writing point P2'), the interactive writing device of the present embodiment can firstly decide the color value corresponding to the color tag of the color tag pattern 1112 on the writing object 1104 according to the color tag searching and color recovery mechanism. For example, the color recovery unit generates a local processed image corresponding to the tag searching region 1108, the tag searching unit searches the color tag corresponding to the color tag pattern 1112 from the local processed image, and then the display control unit generates a color value corresponding to the color tag. Then, when the writing object 1106 starts to write, the background totem identification unit marks the color tag corresponding to the color tag pattern 1112 as a background totem. After the color value corresponding to the color tag pattern 1112 was interpreted, the color tag pattern 1112 is temporarily regarded as a background totem. Even though the tag searching region 1110 corresponding to the writing object 1106 covers both the color tag pattern 1112 and 1114, the interactive writing device of the present embodiment still can complete color interpretation of the color tag pattern 1114 by means of color tag searching and color recovery mechanism disclosed above.

In another situation, the writing objects 1104 and 1106 start writing at the same time (for example, the generation time of the writing point P1' is the same as that of the writing point P2'), the interactive writing device of the present embodiment can firstly decide the color value corresponding to the color tag pattern 1112 on one of the writing objects (the present example is exemplified by the writing object 1104) by means of color tag searching and color recovery mechanism disclosed above. Then, the tag searching unit searches the color tag corresponding to another color tag pattern 1114 from the local processed image that is generated by the color recovery unit and corresponding to the tag searching region 1110. The display control unit sets the color value corresponding to the color tag of another color tag pattern 1114 as a predetermined value. The predetermined value, for example, corresponds to a particular or initial color (such as black), or corresponds to a color of the color tag not corresponding to the color tag pattern 1112 (such as a writing color that has not been used).

Figure 12A:
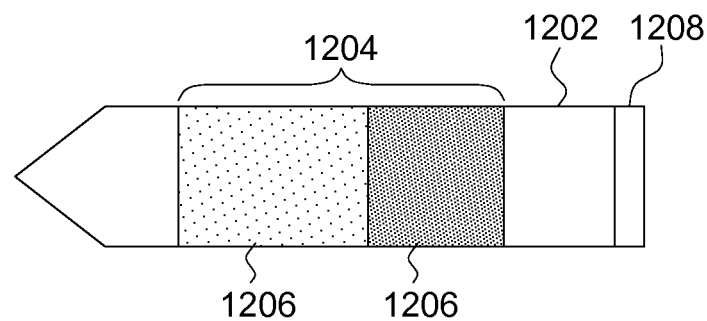
FIG. 12A is a schematic diagram of an example of a color tag pattern according to an embodiment of the disclosure.

Referring to FIG. 12A, a schematic diagram of an example of a color tag pattern according to an embodiment of the disclosure is shown. As indicated in FIG. 12A, the writing object 1202 has a color tag pattern 1204. The color tag pattern 1204 has several color blocks 1206 (only two color blocks 1206 are illustrated in FIG. 12A but the disclosure is not limited thereto). Based on the colors, areas and/or positions of the color blocks 1206, the display control unit of the interactive writing device of the present embodiment can decide the color value corresponding to the color tag pattern 1204. For example, through suitable arrangement in area proportions of the color blocks 1206, the color saturation of the writing trace of the writing object 1202 can be adjusted.

In another example, the writing object 1202 further has an actual color pattern 1208. The color of the actual color pattern 1208 is substantially equivalent to the color of the writing trace of the writing object 1202. Therefore, the user can understand the color of the writing trace of the writing object 1202 through the color of the actual color pattern 1208 to get closer to the actual scenario of writing on a whiteboard.

Figure 12B:
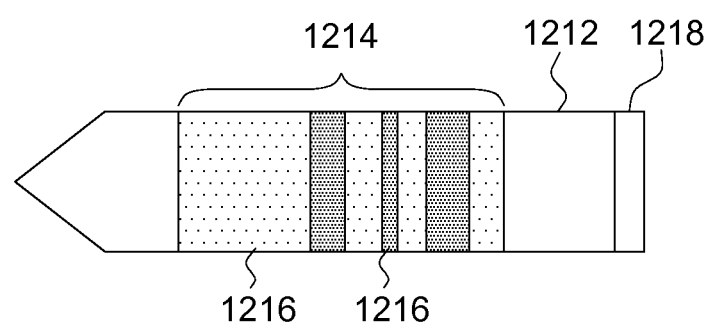
FIG. 12B is a schematic diagram of another example of a color tag pattern according to an embodiment of the disclosure.

Referring to FIG. 12B, a schematic diagram of another example of a color tag pattern according to an embodiment of the disclosure is shown. As shown in FIG. 12B, the color tag pattern 1214 includes several color blocks 1216. The colors, areas, sizes and/or positions of the color blocks 1216 can be adjusted according to the required writing colors (similar to the bar code but is not limited thereto). For example, through suitable arrangement in the quantity, widths and area proportions of the color blocks 1216, color saturation or corresponding color of the writing trace of the writing object 1212 can be adjusted. In the present example, the writing object 1212 can selectively include an actual color pattern 1218 with which the user can identify the color of the writing trace.

Figure 13:
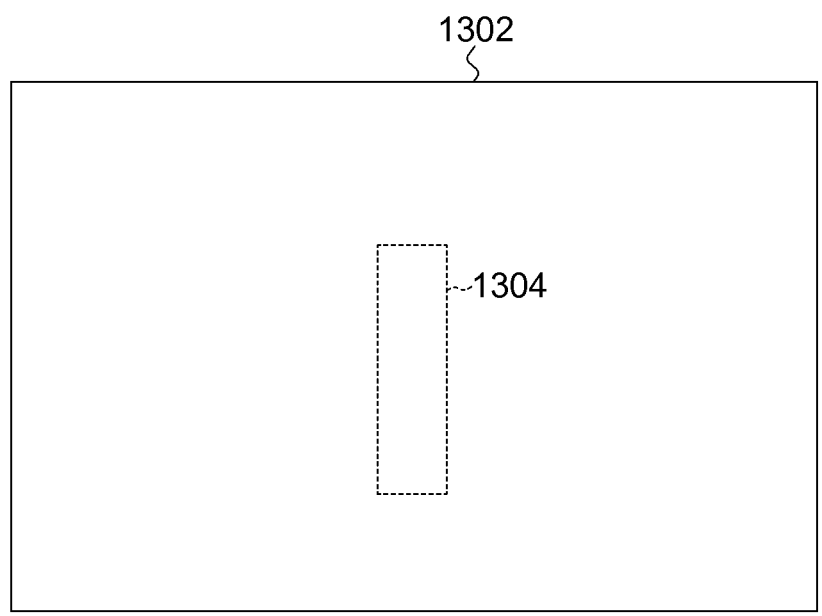
FIG. 13 is a schematic diagram of an example of a color calibration frame generated by an interactive writing device according to an embodiment of the disclosure.

Referring to FIG. 13, a schematic diagram of an example of a color calibration frame 1302 generated by an interactive writing device according to an embodiment of the disclosure is shown. The color calibration frame 1302 is projected to or displayed on a wall or whiteboard. As shown in FIG. 13, the color calibration frame 1302 has a calibration region 1304 indicating the user to place the writing object including the tag pattern with specific color in the calibration region. For example, the calibration region 1304 indicates that the electronic whiteboard pen having a red tag be placed in the calibration region 1304. It is understood that although the calibration region 1304 of FIG. 13 is exemplified by a rectangular pattern, the disclosure is not limited thereto, and the pattern of the calibration region 1304 can be designed to fit practical applications. Meanwhile, when the user places the corresponding writing object (such as the electronic whiteboard pen having red tag) in the calibration region 1304, the capturing unit shoots the writing object to fetch a visible light calibration image. Then, the tag searching unit searches the color tag from the visible light calibration image, and the display control unit sets the color value corresponding to the color tag as a predetermined color value (such as a red color value). Thus, the interactive writing device of the present embodiment can pre-define the color value corresponding to each the color tag by using color calibration mechanism disclosed above to avoid the light source interfering with color interpretation.

To summarize, the interactive writing device of the present embodiment can correctly identify the color value corresponding to the color tag pattern on the writing object. Also, by means of establishing the tag searching region, the interactive writing device of the present embodiment not only effectively reduces the computational cost required for searching the color tag but also reducing the chance of misjudging the color tag. In addition, marking the background totem not only reduces the chance of misjudging the color tag but also help with identifying the colors of multiple color tags.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. An operating method for an interactive writing device, comprising:
   capturing a visible light image in response to an original outputted image;
   establishing a tag searching region in the visible light image in response to a writing operation performed by a writing object, wherein the writing object includes a color tag pattern;
   filtering out the original outputted image corresponding to the tag searching region from the visible light image in the tag searching region to generate a local processed image;
   searching a color tag corresponding to the color tag pattern of the writing object from the local processed image; and
   generating a color value corresponding to the color tag, wherein the step of establishing the tag searching region comprises:
      generating a writing point in response to the writing operation performed by the writing object; and
      establishing the tag searching region according to the position of the writing point which falls within the tag searching region.

2. The operating method according to claim 1, wherein a distance between a writing end of the writing object and the color tag pattern corresponds to a predetermined length in the visible light image, and the maximum distance between the writing point and a boundary of the tag searching region at least is larger than the predetermined length.

3. The operating method according to claim 1, wherein the step of establishing the tag searching region comprises:
   identifying the shape of the writing object from the visible light image; and
   establishing the tag searching region according to the shape of the writing object.

4. The operating method according to claim 1, wherein the step of establishing the tag searching region comprises:
   sequentially capturing a plurality of visible light images at different time points during a period in which the writing object performs the writing operation;
   comparing the visible light images corresponding to different time points to generate an image movement information corresponding to the writing object; and
   establishing the tag searching region according to the image movement information.

5. The operating method according to claim 1, further comprising:
   generating a background totem according to a difference between the original outputted image and the visible light image; and
   marking the background totem in the visible light image;
   wherein, when said searching the color tag is performed, a part of the visible light image marked as the background totem is ignored.

6. The operating method according to claim 5, wherein the step of generating the background totem comprises:
   temporarily storing the original outputted image;
   synchronizing the original outputted image with the captured visible light image, so that the original outputted image and the captured visible light image are corresponding to the same time point;
   dividing the original outputted image and the visible light image into a plurality of image blocks respectively corresponding to an image value;
   comparing the image values corresponding to the image blocks of the original outputted image with the image values corresponding to the image blocks at corresponding positions of the visible light image to generate a difference value between each image block of the visible light image and each image block of the original outputted image; and
   marking the image block of the visible light image whose difference value is larger than a threshold as the background totem.

7. The operating method according to claim 5, further comprising:
   generating a first writing point corresponding to a first tag searching region at a first time point;
   generating a second writing point corresponding to a second tag searching region at a second time point, wherein the second tag searching region partially or completely overlaps the first tag searching region;
   filtering the original outputted image corresponding to the first tag searching region from the first visible light image in the tag searching region to generate a first local processed image, and searching a first color tag from the first local processed image to generate the color value corresponding to the first color tag; and
   after the color value of the first color tag is generated, marking the first color tag as the background totem, and filtering the original outputted image corresponding to the second tag searching region from the second visible light image in the tag searching region to generate a second local processed image, and searching a second color tag from the second local processed image to generate the color value corresponding to the second color tag.

8. The operating method according to claim 1, further comprising:
   detecting a first writing point and a second writing point at a first time point, wherein the first writing point and the second writing point are respectively corresponding to a first tag searching region and a second tag searching region partially or completely overlapping the first tag searching region;
   filtering the original outputted image corresponding to the first tag searching region from the first visible light image in the tag searching region to generate a first local processed image, and searching a first color tag from the first local processed image to generate the color value corresponding to the first color tag; and
   searching a second color tag from the second tag searching region, and setting the color value corresponding to the second color tag as a predetermined value.

9. The operating method according to claim 1, wherein the color tag comprises a plurality of color blocks, and the method further comprises:
   determining the color value corresponding to the color tag according to the color blocks.

10. The operating method according to claim 1, further comprising:

providing a color calibration frame, wherein the color calibration frame has a calibration region indicating the writing object to be the placed therein;

shooting the writing object and fetching a visible light calibration image from the image of the writing object when the writing object is placed in the calibration region; and searching the color tag corresponding to the color tag pattern of the writing object from the visible light calibration image; and setting the color value as a predetermined color value.

11. The operating method according to claim 1, further comprising:

displaying a trace having the color value in response to the writing operation performed by the writing object.

12. The operating method according to claim 1, further comprising:

activating a predetermined function according to the color value corresponding to the color tag in response to the writing operation performed by the writing object.

* * * * *